(12) United States Patent
Axelrod et al.

(10) Patent No.: US 12,150,536 B2
(45) Date of Patent: *Nov. 26, 2024

(54) ADJUSTABLE NAIL TRIMMER

(71) Applicant: FOUR PAWS PRODUCTS, LTD., Neptune City, NJ (US)

(72) Inventors: Glen S. Axelrod, Colts Neck, NJ (US); Ajay Gajria, Holmdel, NJ (US); Diana M. Echeverri, Beachwood, NJ (US)

(73) Assignee: Four Paws Products, Ltd., Neptune City, NJ (US)

( * ) Notice: Subject to any disclaimer, the term of this patent is extended or adjusted under 35 U.S.C. 154(b) by 252 days.

This patent is subject to a terminal disclaimer.

(21) Appl. No.: 17/805,360

(22) Filed: Jun. 3, 2022

(65) Prior Publication Data

US 2022/0386753 A1 Dec. 8, 2022

Related U.S. Application Data

(60) Provisional application No. 63/202,269, filed on Jun. 3, 2021.

(51) Int. Cl.
*A45D 29/02* (2006.01)
(52) U.S. Cl.
CPC .................................. *A45D 29/02* (2013.01)
(58) Field of Classification Search
CPC .................................................... A45D 29/02

(Continued)

(56) References Cited

U.S. PATENT DOCUMENTS

| 3,838,507 A | 10/1974 | Clark |
| 4,158,914 A * | 6/1979 | Kurtz ..................... B26B 13/06 |
| | | 30/131 |

(Continued)

FOREIGN PATENT DOCUMENTS

| CN | 104544900 | 4/2015 |
| JP | 6459117 | 1/2019 |

(Continued)

OTHER PUBLICATIONS

International Search Report and Written Opinion from related PCT Appln No. PCT/US21/70779, dated Nov. 9, 2021.

(Continued)

*Primary Examiner* — Omar Flores Sanchez
(74) *Attorney, Agent, or Firm* — Grossman, Tucker, Perreault & Pfleger, PLLC (57) ABSTRACT

Trimming shears to cut an animal claw comprising a first body and a second body pivotally coupled about a pivot axis, in a pivot plane, a blade having a cutting edge, the blade movable in a blade plane along a blade path, in response to pivotal movement of the first body and/or the second body, wherein the blade plane is transverse to the pivot plane, a guide coupled to the first body, the guide movable in a guide plane along a guide path, wherein the guide plane is substantially parallel to the blade plane and the guide having a plurality of apertures extending through the guide, and wherein each aperture of the guide is positionable relative to the cutting edge of the blade such that, when the blade is moved from a retracted position to an extended position, the cutting edge cuts a claw when disposed in each aperture, respectively.

20 Claims, 11 Drawing Sheets

(58) Field of Classification Search
USPC ..................................................... 30/28, 233
See application file for complete search history.

(56) References Cited

U.S. PATENT DOCUMENTS

| | | | |
|---|---|---|---|
| 4,228,585 | A | 10/1980 | Nelson |
| 4,956,915 | A | 9/1990 | Anderson |
| 4,982,747 | A | 1/1991 | Shah |
| 5,533,262 | A | 7/1996 | Clark |
| 5,918,375 | A * | 7/1999 | Rossi, III .............. A45D 29/02 132/75.5 |
| 6,557,259 | B1 | 5/2003 | Nguyen |
| 7,263,775 | B2 | 9/2007 | Moulton, III |
| 11,317,692 | B2 | 5/2022 | Axelrod et al. |
| 2005/0132975 | A1 | 6/2005 | Huggans |
| 2007/0137041 | A1 | 6/2007 | Manheimer et al. |
| 2009/0056732 | A1 | 3/2009 | Drelinger |
| 2009/0158593 | A1 * | 6/2009 | Smith .................... A01K 17/00 30/28 |
| 2014/0090527 | A1 * | 4/2014 | Behlen .................. B26B 13/00 83/13 |
| 2015/0101194 | A1 | 4/2015 | Jui-Tsang |
| 2016/0330937 | A1 | 11/2016 | Peschardt |
| 2017/0318785 | A1 | 11/2017 | Levy et al. |

FOREIGN PATENT DOCUMENTS

| | | |
|---|---|---|
| KR | 10-2018-0062085 | 6/2018 |
| KR | 10-1875068 | 7/2018 |

OTHER PUBLICATIONS

International Search Report and Written Opinion from corresponding PCT Appln. No. PCT/US2022/072752 dated Aug. 17, 2022.
Office Action from related Australian Appln. No. 2021299574, dated Oct. 13, 2024.
Office Action from related Japanese Appln. No. 2022-567527, dated Dec. 4, 2024.
Extended Search Report from related EPO Appln. No. 21831759.2, dated Jun. 12, 2024.

* cited by examiner

ADJUSTABLE NAIL TRIMMER

CROSS-REFERENCE TO RELATED APPLICATIONS

This application claims the benefit of U.S. provisional patent application Ser. No. 63/202,269 filed Jun. 3, 2021, the entire disclosure of which is incorporated herein by reference.

FIELD

The present disclosure is generally directed to grooming tools for animals and more specifically to nail trimmers for an animal having one or more claws.

BACKGROUND

Domesticated animals having one or more claws may have difficulty maintaining the claws at a comfortable length. As such, in some instances, an owner of the domesticated animal may provide a device to the animal that the animal can use to naturally maintain their claws. For example, for a feline, the owner may provide a scratch post such that the feline can naturally wear the claw length down to a comfortable length through use of the scratch post.

In other instances, the owner may become actively involved in maintaining a length of the domesticated animal's claws. For example, the owner may cut the claws using a pair of trimming shears. While cutting the claws using shears, the owner may accidentally harm the animal if proper care is not exercised. For example, cutting a claw too short may cause physical pain to the domesticated animal and potentially result in bleeding (also referred to as cutting the quick).

As such, some shears are capable of detecting and indicating a safe cutting length such that the owner does not cut the quick of the domesticated animal. However, the domesticated animal may struggle during the claw trimming process and the owner may still cut the claw too short accidentally. As such, some shears may include a physical stop that prevents the claw from being cut too short. However, given variability amongst the claws of domesticated animals and/or the frequency of cutting the claws, the physical stop may not be equally effective for all domesticated animals (e.g., a user may still cut the quick of their domesticated animal accidentally).

SUMMARY

The present disclosure is generally directed to trimming shears for cutting (or trimming) a claw of a domesticated animal.

Trimming shears to cut an animal claw comprising a first body and a second body pivotally coupled about a pivot axis, in a pivot plane, a blade having a cutting edge, the blade movable in a blade plane along a blade path, in response to pivotal movement of the first body and/or the second body, wherein the blade plane is transverse to the pivot plane, a guide coupled to the first body, the guide movable in a guide plane along a guide path, wherein the guide plane is substantially parallel to the blade plane and the guide having a plurality of apertures extending through the guide, and wherein each aperture of the guide is positionable relative to the cutting edge of the blade such that, when the blade is moved from a retracted position to an extended position, the cutting edge cuts a claw when disposed in each aperture, respectively.

Trimming shears to cut one or more claws of an animal comprising a first body having a first handle portion; a second body having a second handle portion; the first body and the second body pivotally coupled such that at least one of the first body and the second body pivot relative to each other, about a pivot axis, in a pivot plane; a blade having a cutting edge, the blade movable in a blade plane along a blade path, between a retracted position and an extended position, in response to pivotal movement of at least one of the first body and the second body relative to each other, wherein the blade plane is transverse to the pivot plane; a guide coupled to the first body, the guide movable in a guide plane along a guide path, wherein the guide plane is substantially parallel to the blade plane and the guide having a plurality of apertures extending through the guide, each aperture of the plurality of apertures having a different size to receive the one or more claws; and wherein each aperture of the guide is positionable relative to the cutting edge of the blade such that, when the blade is moved from the retracted position to the extended position, the cutting edge cuts a claw when disposed in each aperture, respectively.

The trimming shears further comprising the blade and the guide being disposed adjacent one another and/or in contact with one another.

The trimming shears further comprising a bottom surface of the guide being adjacent and in contact with a top surface of the guide.

The trimming shears further comprising the blade and the guide being at least partially disposed in an enclosed passage.

The trimming shears further comprising the cutting edge being concealed with the enclosed passage when the blade is in the retracted position.

The trimming shears further comprising the enclosed passage being a rectangular passage.

The trimming shears further comprising the enclosed passage being formed by a rectangular ring.

The trimming shears further comprising the blade being planar and the guide being planar.

The trimming shears further comprising the blade being movable linearly in the blade plane along the blade path and/or being slidable in the blade plane along the blade path.

The trimming shears further comprising the guide being movable linearly in the guide plane along the guide path and/or being slidable in the guide plane along the guide path.

The trimming shears further comprising the cutting edge being arcuate.

The trimming shears further comprising at least one aperture of the plurality of apertures being circular.

The trimming shears further comprising at least one aperture of the plurality of apertures being non-circular.

The trimming shears further comprising a bias mechanism which urges the blade to the retracted position when in the extended position.

The trimming shears further comprising the blade plane being substantially perpendicular to the pivot plane.

BRIEF DESCRIPTION OF THE DRAWINGS

These and other features and advantages will be better understood by reading the following detailed description, taken together with the drawings, wherein:

FIG. 16(A)-(D) shows a perspective view of the trimming shears of FIG. 12 in a pre-cut position with the guide in four different guide positions.

DETAILED DESCRIPTION OF PREFERRED EMBODIMENTS

The present disclosure is generally directed to trimming shears for cutting (or trimming) a claw of a domesticated animal. The trimming shears include a first handle, a second handle, and at least one blade. Pivotal movement of the first handle relative to the second handle urges the blade between a pre-cut position and a cut position. The transition from the pre-cut position to the cut position being configured to cut a claw positioned in the blade path. The trimming shears may further include a guide for receiving a respective claw and guiding the claw to be positioned within the blade path. In one example, the guide may include a single aperture, wherein an effective opening area of the aperture is adjustable to accommodate a respective claw. In another example, the guide may include a plurality of apertures, each sized for receiving a respective claw size. As such, the guide may generally be described as reducing a risk of accidentally cutting the quick when cutting the claw.

Figure 1A:
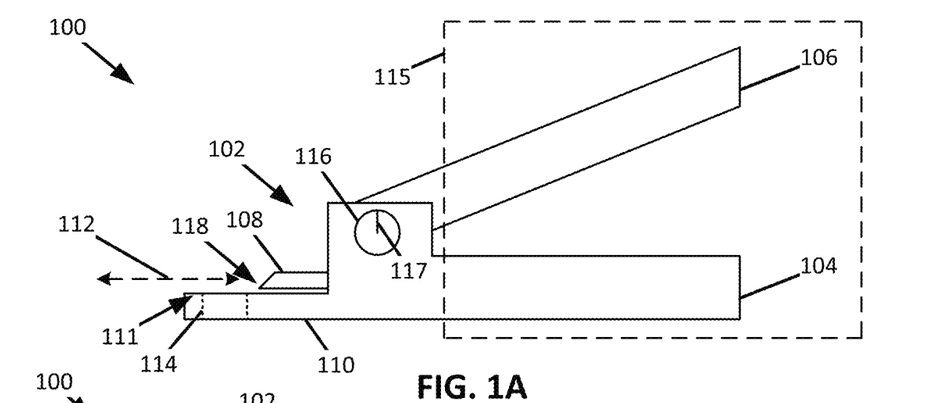
FIG. 1A shows a schematic side view of an example of trimming shears for cutting a claw of a domesticated animal in a pre-cut position, consistent with embodiments of the present disclosure.
Figure 1B:
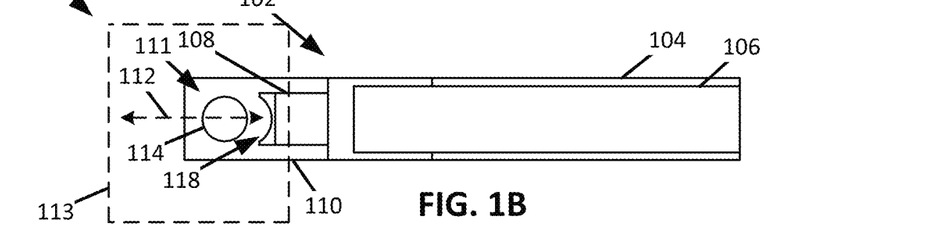
FIG. 1B shows a schematic top view of the trimming shears of FIG. 1A, consistent with embodiments of the present disclosure.
Figure 2A:
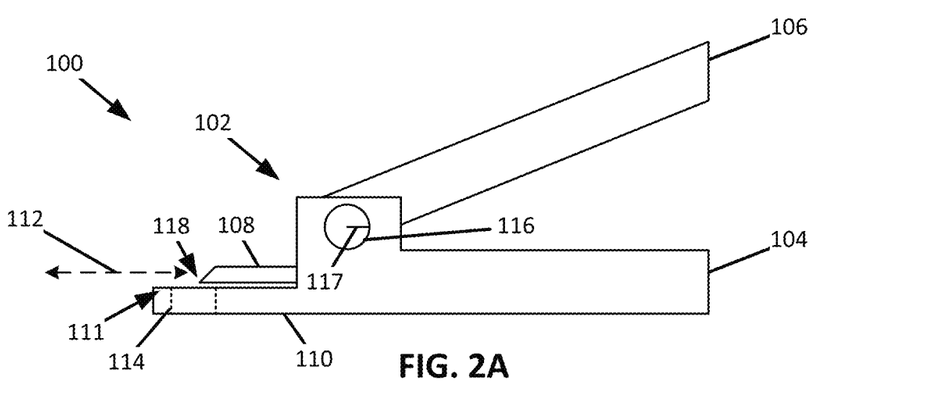
FIG. 2A shows a schematic side view of the trimming shears of FIG. 1A in another pre-cut position, consistent with embodiments of the present disclosure.
Figure 2B:
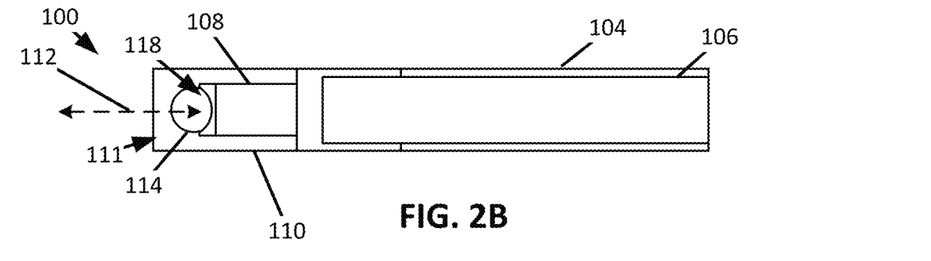
FIG. 2B shows a schematic top view of the trimming shears of FIG. 2A, consistent with embodiments of the present disclosure.
Figure 3A:
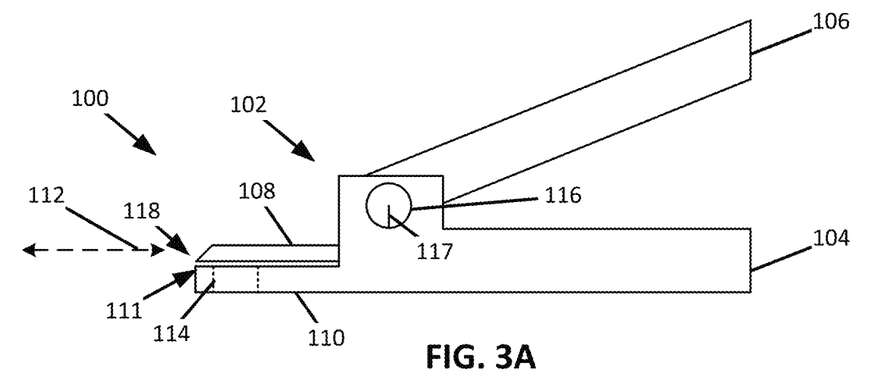
FIG. 3A shows a schematic side view of the trimming shears of FIG. 1A in a cut position, consistent with embodiments of the present disclosure.
Figure 3B:
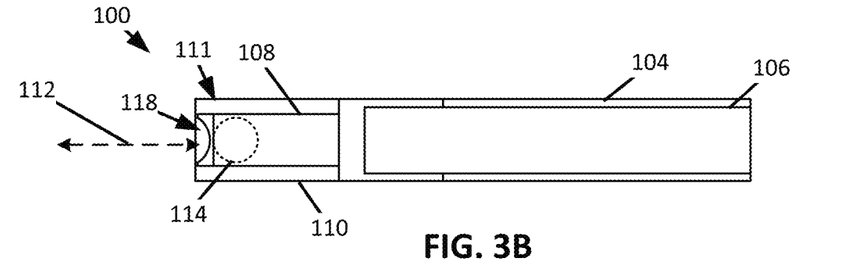
FIG. 3B shows a schematic top view of the trimming shears of FIG. 3A, consistent with embodiments of the present disclosure.
Figure 4A:
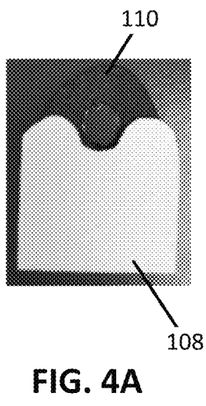
FIG. 4A shows an example of a cutting blade of the trimming shears of FIG. 1A in a first pre-cut position, consistent with embodiments of the present disclosure.
Figure 4B:
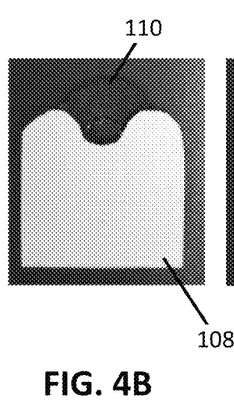
FIG. 4B shows an example of a cutting blade of the trimming shears of FIG. 1A in a second pre-cut position, consistent with embodiments of the present disclosure.
Figure 4C:
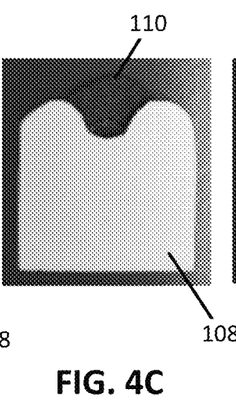
FIG. 4C shows an example of a cutting blade of the trimming shears of FIG. 1A in a third pre-cut position, consistent with embodiments of the present disclosure.
Figure 4D:
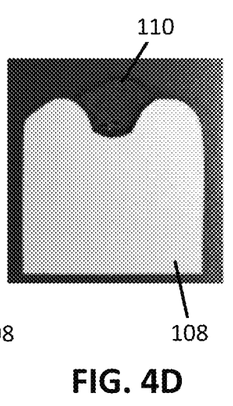
FIG. 4D shows an example of a cutting blade of the trimming shears of FIG. 1A in a fourth pre-cut position, consistent with embodiments of the present disclosure.

FIGS. 1-3 show a schematic example of trimming shears 100. The trimming shears 100 include a body 102 defining a first handle 104, a second handle 106 pivotally coupled to the body 102, a blade 108, and a guide 110 extending from the body 102. The guide 110 defines an aperture 114 for receiving at least a portion of a claw of an animal. Pivotal movement of the second handle 106 relative to the first handle 104 urges the blade 108 along a blade path 112 between a pre-cut position (e.g., as shown in FIGS. 1 and 2) and a cut position (e.g., as shown in FIG. 3). The blade path 112 extends in a blade plane 113 such that the blade 108 moves linearly in the blade plane 113 and parallel to a top surface 111 of the guide 110. The blade plane 113 extends transverse to (e.g., perpendicular to) a handle plane 115. The handle plane 115 extends through the first and second handle 104 and 106 such that the pivotal movement of the first and/or second handles 104 and 106 occurs in the handle plane 115.

When in the pre-cut position, the blade 108 is positioned along the guide 110 such that a claw received within the aperture 114 is not in cutting contact with the blade 108 (e.g., the blade 108 may be in contact with the claw but has not penetrated the claw). In some instances, when the blade 108 is in the pre-cut position, the blade 108 may partially obscure the aperture 114 (e.g., as shown in FIG. 2). As such, when the blade 108 is in the pre-cut position, a maximum insertion distance of the claw within the aperture 114 may be at least partially defined by the pre-cut position of the blade 108. In other words, an effective opening area of the aperture 114 (e.g., the opening area of the aperture 114 capable of receiving a claw) may be adjusted through adjusting the pre-cut position of the blade 108 relative to the aperture 114.

The trimming shears 100 may include an indexer 116 configured to adjust the pre-cut position of the blade 108 relative to the aperture 114. For example, the indexer 116 can be configured to adjust the pre-cut position of the blade 108 such that the blade 108 partially obscures the aperture 114 when in the pre-cut position. As such, the indexer 116 can generally be described as adjusting a maximum insertion distance of a claw within the aperture 114. In other words, a maximum insertion distance of the claw within the aperture 114 is at least partially defined by the pre-cut position of the blade 108. In some instances, the indexer 116 may include an indicator 117 that is configured to provide an indication of the maximum insertion distance for a respective pre-cut position. For example, the indicator 117 may be configured to provide an indication of the effective opening area of the aperture 114 for a respective pre-cut position of the blade 108. In other words, the indicator 117 may provide an indication of an amount of overlap between the blade 108 and the aperture 114 for a respective pre-cut position (e.g., using a numerical scale). In some instances, the indexer 116 can be configured to adjust the blade 108 between two or more predetermined pre-cut positions. For example, the indexer 116 can be configured to adjust the blade 108 between at least four predetermined pre-cut positions (see, e.g., FIGS. 4A-4D showing an example of the blade 108 being adjusted between four different predetermined pre-cut positions along the guide 110). Alternatively, the indexer 116 can be configured such the pre-cut position of the blade 108 can generally be described as being infinitely adjustable.

In some instances, the indexer 116 can be configured to be rotated by a user. Rotation of the indexer 116 may cause the blade 108 to move relative to the guide 110 and along the blade path 112 such that the pre-cut position is adjusted. In other words, rotation of the indexer 116 may cause a corresponding linear movement of the blade 108, adjusting the pre-cut position of the blade 108. For example, the indexer 116 may include a gear configured to engage a corresponding rack coupled to or defined by the blade 108 such that rotation of the indexer 116 causes a corresponding linear movement of the blade 108. By way of further example, the indexer 116 may include a cam configured to engage (directly or indirectly) a portion of the blade 108 such that rotation of the indexer 116 causes a corresponding linear movement of the blade 108. Additionally, or alternatively, the pre-cut position may be adjusted through the pivotal movement of the second handle 106 relative to the first handle 104. For example, when the blade 108 is at the desired pre-cut position after the pivotal movement, the indexer 116 can be actuated such that the pre-cut position is adjusted to the current position of the blade 108. In this example, the indexer 116 can be configured to be depressed and actuate a blade lock. Actuation of the blade lock adjusts the pre-cut position to the current position of the blade 108.

As shown, the blade 108 defines a cutting edge 118 having an arcuate shape (e.g., a semi-circular or semi-elliptical shape). The arcuate shape may generally correspond to the shape of a claw. As such, when the pre-cut position of the blade 108 is adjusted, the exposed area of the aperture 114 has a generally arcuate shape (e.g., a circular or elliptical shape). This may allow for an improved adjustment of the maximum insertion distance of a respective claw when compared to a configuration where the cutting edge 118 has a linear shape.

As shown, the aperture 114 may have a circular shape. A circular shape may allow for a greater variability of claw sizes to be received within the aperture 114 when the pre-cut position of the blade 108 is adjustable (e.g., when compared to an example where the aperture 114 has an elliptical shape). However, the aperture 114 may have any shape including, for example, an elliptical shape.

Figure 5:
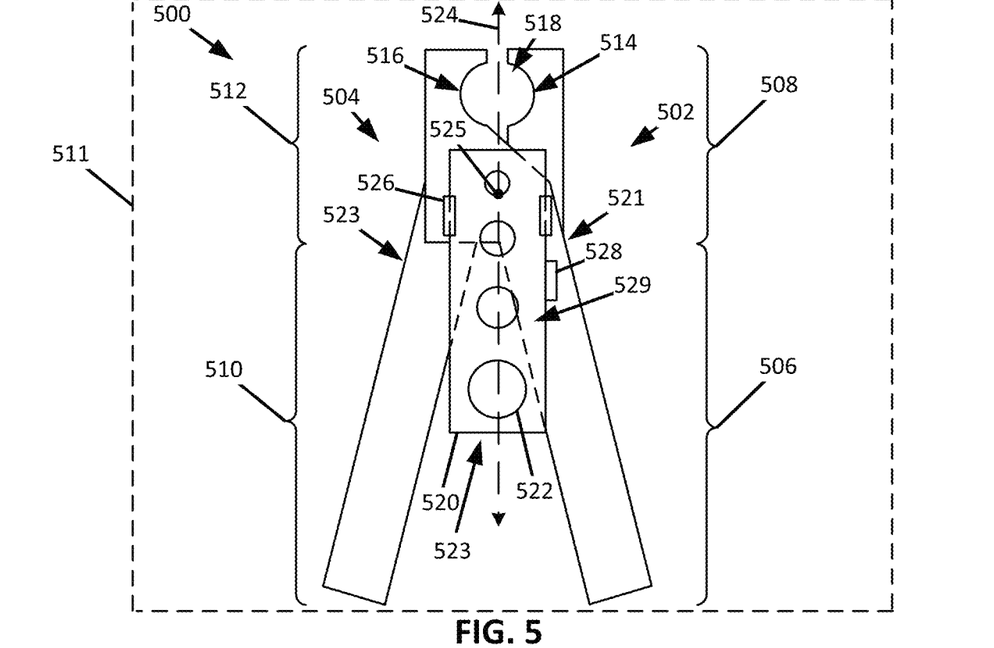
FIG. 5 shows a schematic top view of an example of trimming shears for cutting a claw of a domesticated animal having a guide in a storage position, consistent with embodiments of the present disclosure.
Figure 6:
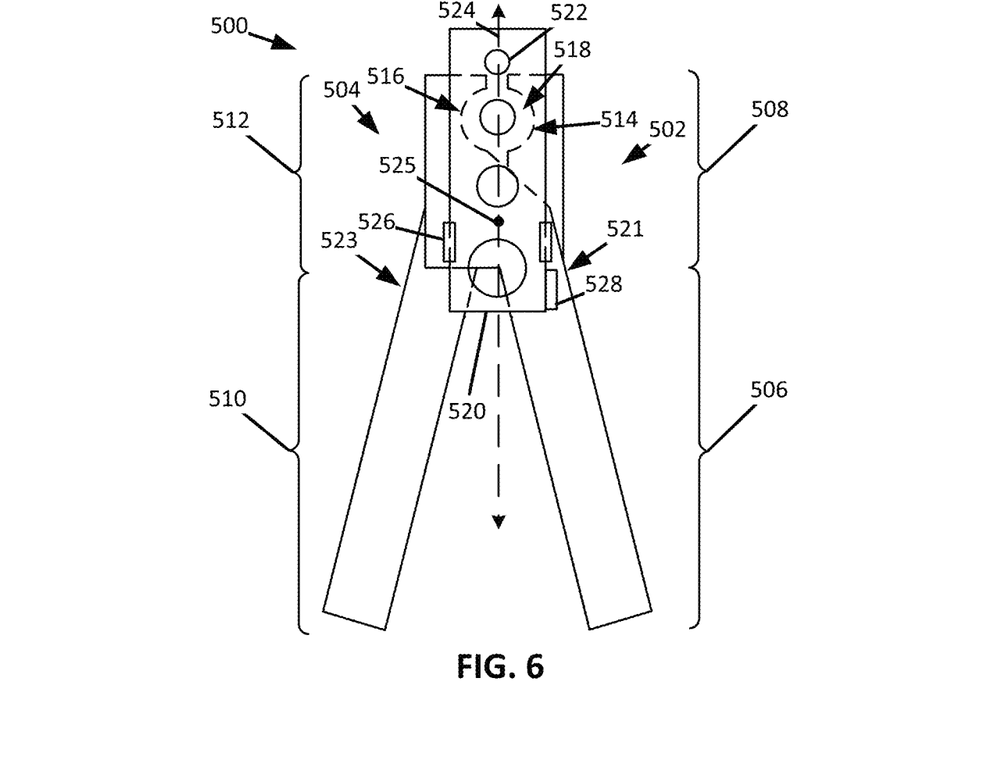
FIG. 6 shows another schematic top view of the trimming shears of FIG. 5, wherein the guide is in a use position, consistent with embodiments of the present disclosure.

FIGS. 5 and 6 show a schematic example of trimming shears 500. The trimming shears 500 include a first body 502 and a second body 504. The first body 502 includes a first handle portion 506 and a first cutting portion 508. The second body 504 includes a second handle portion 510 and a second cutting portion 512. The first body 502 is pivotally coupled to the second body 504 such that, when the first and second handle portions 506 and 510 are pivoted towards each other, the first and second cutting portions 508 and 512 are pivoted towards each other. As shown, the handle portions 506 and 510 and the cutting portions 508 and 512 pivot in a common plane 511. The first and second cutting portions 508 and 512 each define a corresponding cutting edge 514 and 516. One or more of the cutting edges 514 and/or 516 may have an arcuate shape. The first and second cutting edges 514 and 516 define a cutting region 518 therebetween. In other words, the cutting region 518 can generally be described as being defined between the first and second cutting portions 508 and 512. The cutting region 518 is configured to receive a claw such that, when the cutting edges 514 and 516 are transitioned from a pre-cut position to a cut position, a claw positioned therein is cut.

The trimming shears 500 include a guide 520 having a receiving (or top) surface 529, a blade facing (or bottom) surface opposite the receiving surface 529, and a plurality of apertures 522 extending from the receiving surface 529 and through the blade facing surface. The blade facing surface and the receiving surface 529 are substantially parallel to (e.g., within 5°, 4°, 3°, 2°, or 1° of parallel) the common plane 511.

Figure 7:
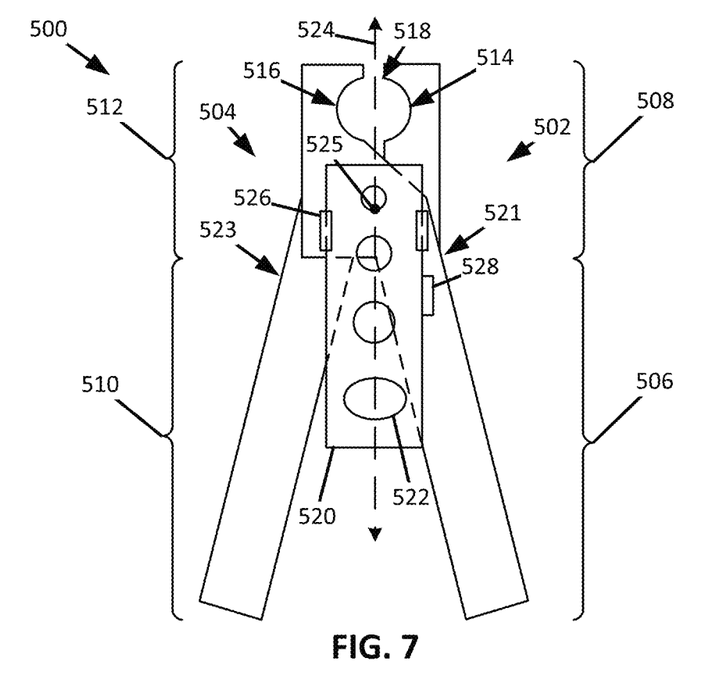
FIG. 7 shows a schematic top view of an example of the trimming shears of FIG. 5, wherein the guide includes at least one non-circular aperture, consistent with embodiments of the present disclosure.

The apertures 522 are configured to receive a claw of an animal therein. For example, the guide 520 may include at least four apertures 522. The guide 520 may be configured to be transitioned between a storage position (e.g., as shown in FIG. 5) and a use position (e.g., as shown in FIG. 6). When in the use position, at least a portion of the guide 520 is configured to extend over the cutting region 518 such that at least one aperture 522 can be aligned with (e.g., centrally aligned with) the cutting region 518. Each of the apertures 522 has a different size, wherein each size is configured to limit a maximum insertion distance of a claw inserted therein. As such, the size of the apertures 522 may be based on a claw size for various animals and/or animals of different sizes. For example, and as shown, the guide 520 may include four apertures 522 arranged according to size from largest to smallest. In some instances, and as shown, each of the apertures 522 may have a circular shape. In other instances, at least one of the apertures 522 may have a non-circular shape. For example, as shown in FIG. 7, at least one aperture 522 may have an elliptical shape. The apertures 522 may include a tapered region extending around a perimeter of the apertures 522 such that a central cross-section of at least a portion of each of the apertures 522 is frustoconical. Such a configuration may allow for a claw to be more easily inserted therein.

The guide 520 is slidably coupled to one of the first or second bodies 502 or 504 such that a position of the guide 520, relative to the cutting region 518, can be adjusted. For example, the guide 520 can be slid along the first or second bodies 502 or 504 such that an aperture 522 having a size that corresponds to a claw of an animal to be trimmed is aligned with the cutting region 518. As shown, the guide 520 is configured to slide parallel to a sliding axis 524. The sliding axis 524 can extend substantially parallel to the common plane 511. For example, the guide 520 can be configured to slide along the sliding axis 524 and along (e.g., substantially parallel to) a top surface 521 or 523 of a respective one of the first or second bodies 502 or 504. The top surfaces 521 and 523 of the first and second bodies 502 and 504 may generally be described as the surface of the first and second bodies 502 and 504 that face an animal when inserting a claw into the aperture 522. The sliding axis 524 extends between the first and second handle portions 506 and 510, through a pivot point 525 of the first and second bodies 502 and 504, and between the first and second cutting portions 508 and 512.

The guide 520 is configured to slide linearly along the sliding axis 524. For example, the first body 502 may include a plurality of rails 526 configured to slidably receive the guide 520 therein. In other words, the guide 520 is slidably coupled to the first body 502 using the rails 526. The guide 520 can be configured to form an interference fit with the rails 526 such that movement of the guide 520 within the rails 526 requires exertion of a predetermined amount of force. Additionally, or alternatively, the trimming shears 500 may include an indexer 528 coupled to the first body 502 or the second body 504 and configured to releasably engage a portion of the guide 520. The indexer 528 is configured to retain the guide 520 at a predetermined position. For example, the indexer 528 may include a cam configured to exert a clamping force on the guide 520 such that the guide 520 is retained in a desired position. By way of further example, the indexer 528 may include one or more teeth configured to engage corresponding recesses in the guide 520 such that the guide 520 is retained in a desired position. In some instances, the indexer 528 may include a gear configured to engage a corresponding rack coupled to or defined by the guide 520 such that rotational movement of the gear causes a corresponding linear movement of the guide 520.

In some instances, the guide 520 may be removable from the rails 526. Removal of the guide 520 from the rails 526 allows the guide 520 to be inserted into the rails 526 in a reverse orientation. For example, for a guide 520 having four apertures 522 arranged by size, in a first orientation the smallest two apertures 522 may be capable of being aligned with the cutting region 518 and, when the orientation is reversed to a second orientation, the largest two apertures 522 may be capable of being aligned with the cutting region 518. Such a configuration may allow an overall longitudinal length of the guide 520 to be shortened.

Figure 8:
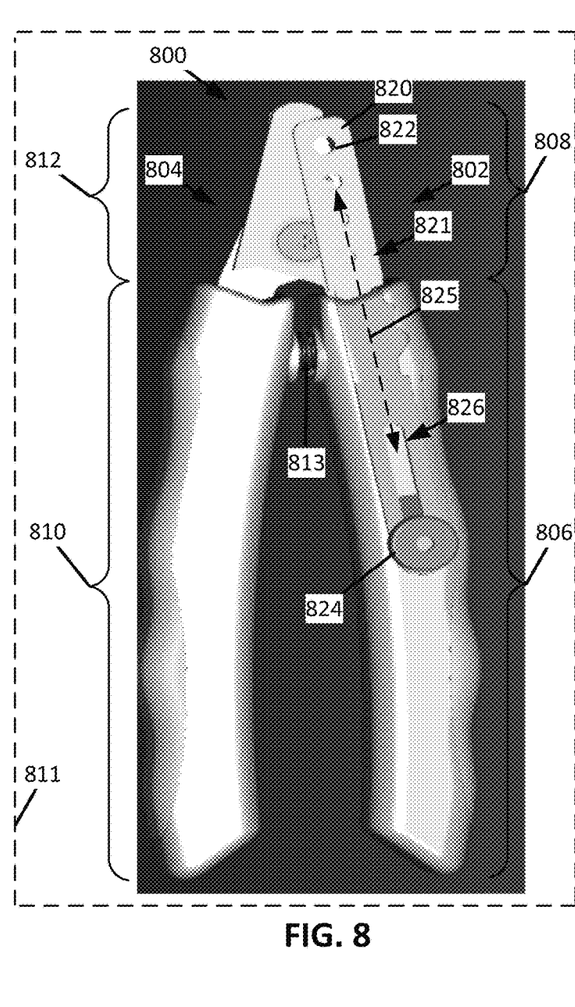
FIG. 8 shows a top view of an example trimming shears in a cut position, consistent with embodiments of the present disclosure.
Figure 9:
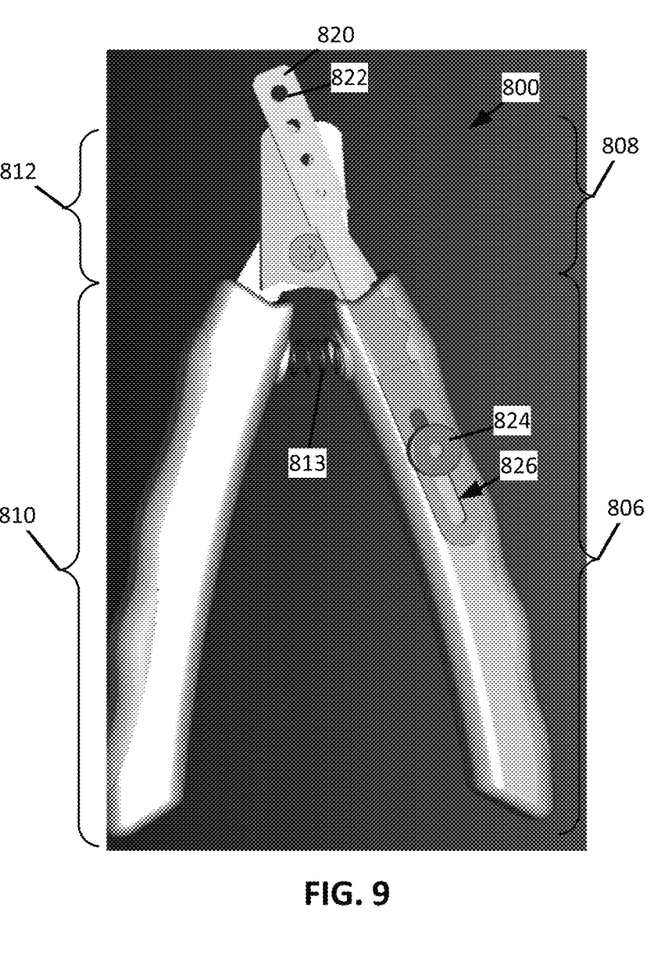
FIG. 9 shows a top view of the trimming shears of FIG. 8 in a pre-cut position, consistent with embodiments of the present disclosure.
Figure 10:
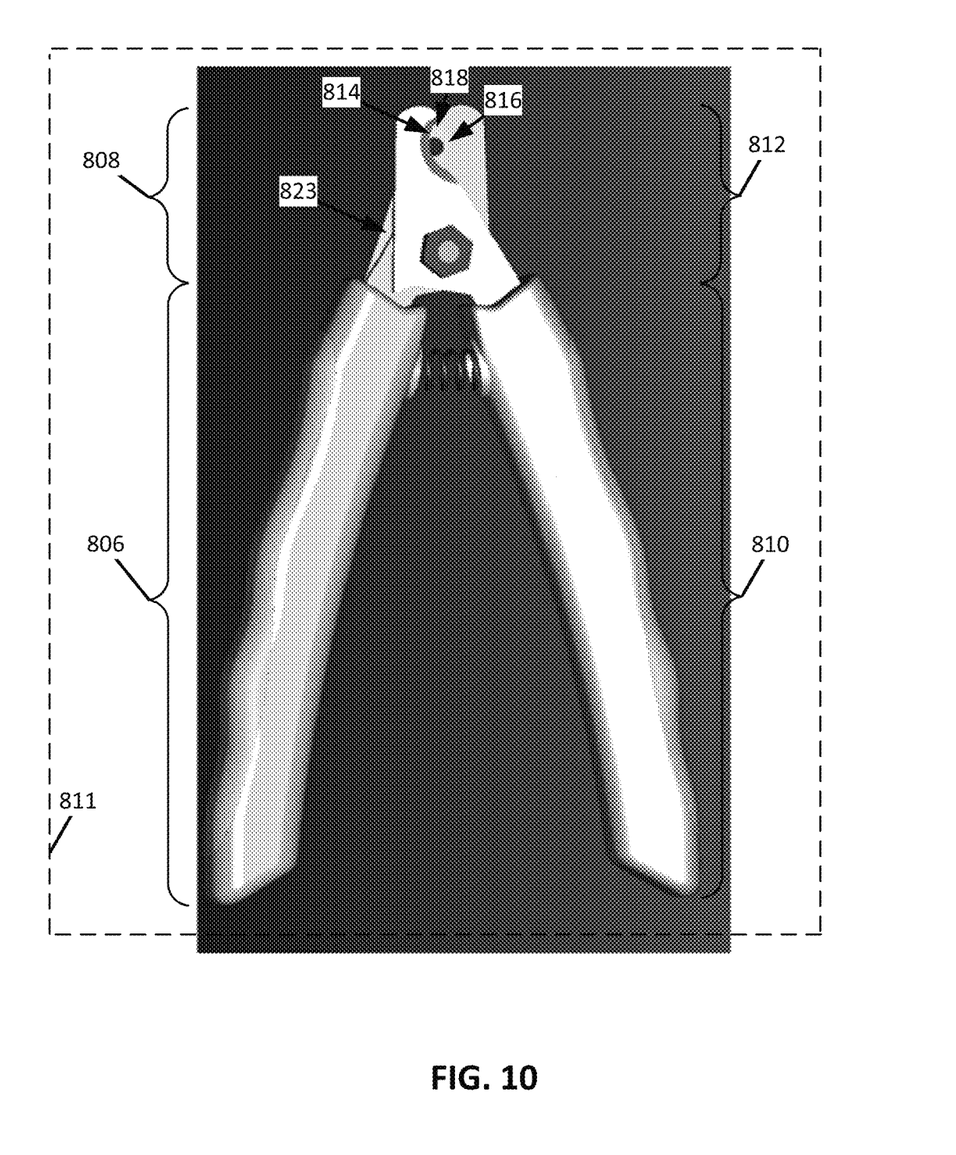
FIG. 10 shows a bottom view of the trimming shears of FIG. 8 in a pre-cut position, consistent with embodiments of the present disclosure.

FIG. 8 shows a top view of example trimming shears 800 in a cut position, FIG. 9 shows a top view of the trimming shears 800 in a pre-cut position, and FIG. 10 shows a bottom view of the trimming shears 800 in a pre-cut position. The trimming shears 800 include a first body 802 and a second body 804. The first body 802 includes a first handle portion 806 and a first cutting portion 808. The second body 804 includes a second handle portion 810 and a second cutting portion 812. The first body 802 is pivotally coupled to the second body 804 such that, when the first handle portion 806 is pivoted towards the second handle portion 810, the first cutting portion 808 pivots towards the second cutting portion 812. In other words, the first and second bodies 802 and 804 transition between cut and pre-cut positions in response to pivotal movement. A biasing mechanism 813 (e.g., a spring) may be disposed between the first and second bodies 802 and 804 such that biasing mechanism 813 urges the first and second bodies 802 and 804 towards the pre-cut position.

As shown, the first handle portion 806, the first cutting portion 808, the second handle portion 810, and the second cutting portion 812 pivot in a common plane 811. The first and second cutting portions 808 and 812 each define corresponding cutting edges 814 and 816. The cutting edges 814 and 816 may have an arcuate shape. A cutting region 818 is defined between the first and second cutting edges 814 and 816. In other words, the cutting region 818 can generally be described as being defined between the first and second cutting portions 808 and 812. The cutting region 818 is configured to receive a claw therein. When a claw is received within the cutting region 818, the cutting edges 814 and 816 are configured to cut the claw in response to the pivotal movement of the first and second handle portions 806 and 810. In other words, a claw positioned within the cutting region 818 is cut in response to the trimming shears 800 being transitioned from the pre-cut position to the cut position.

The trimming shears 800 include a guide 820 slidably coupled to the first body 802 or the second body 804. The guide 820 has a receiving (or top) surface 821, a blade facing (or bottom) surface 823 opposite the receiving surface 821, and a plurality of apertures 822 extending from the receiving surface 821 and through the blade facing surface 823. The blade facing surface and the receiving surface 821 and 823 are substantially parallel to (e.g., within 5°, 4°, 3°, 2°, or 1° of parallel) the common plane 811.

The apertures 822 are configured to receive a claw of an animal therein. For example, the guide 820 may include at least four apertures 822, each aperture 822 having a different opening size (e.g., diameter). In some instances, the apertures 822 may be arranged according to opening size (e.g., from smallest to largest). Each opening size can correspond to a maximum insertion distance of a claw received therein. For example, a diameter of each of the apertures 822 may measure in range of 0.5 millimeter (mm) to 6.5 mm. By way of further example, a first aperture 822 may have a diameter measuring 2 mm, a second aperture 822 may have a diameter measuring 2.5 mm, a third aperture 822 may have a diameter measuring 3 mm, and a fourth aperture 822 may have a diameter measuring 3.5 mm. By way of still further example, a first aperture 822 may have a diameter measuring 4 mm, a second aperture 822 may have a diameter measuring 4.5 mm, a third aperture 822 may have a diameter measuring 5 mm, and a fourth aperture 822 may have a diameter measuring 5.5 mm. By way of still further example, a first aperture 822 may have a diameter measuring 1.5 mm, a second aperture 822 may have a diameter measuring 2 mm, a third aperture 822 may have a diameter measuring 2.5 mm, and a fourth aperture 822 may have a diameter measuring 3 mm.

In some instances, a measure of a difference in diameter between immediately adjacent apertures 822 may be at least 0.5 mm. For example, a first aperture 822 may have a diameter that measures 1.5 mm and a second, immediately adjacent, aperture 822 may have a diameter that measures 2 mm. While the guide 820 is shown as having four apertures 822, the guide 820 may have any number of apertures 822. For example, the guide 820 may have at least two apertures 822, at least three apertures 822, or any other number of apertures 822.

The guide 820 is configured to be slidable relative to the cutting region 818 such that a respective aperture 822 may be aligned (e.g., centrally aligned) with the cutting region 818. For example, the guide 820 can be configured to slide linearly along a sliding axis 825 that extends substantially parallel to the common plane 811.

In some instances, the guide 820 can be configured to be slidably coupled to the first handle portion 806 of the first body 802. For example, the guide 820 can be slidably received within the first handle portion 806. As shown, an actuator 824 extends from a slot 826 extending along the first handle portion 806, wherein movement of the actuator 824 relative to the slot 826 causes a corresponding movement of the guide 820 relative to the cutting region 818.

Figure 11:
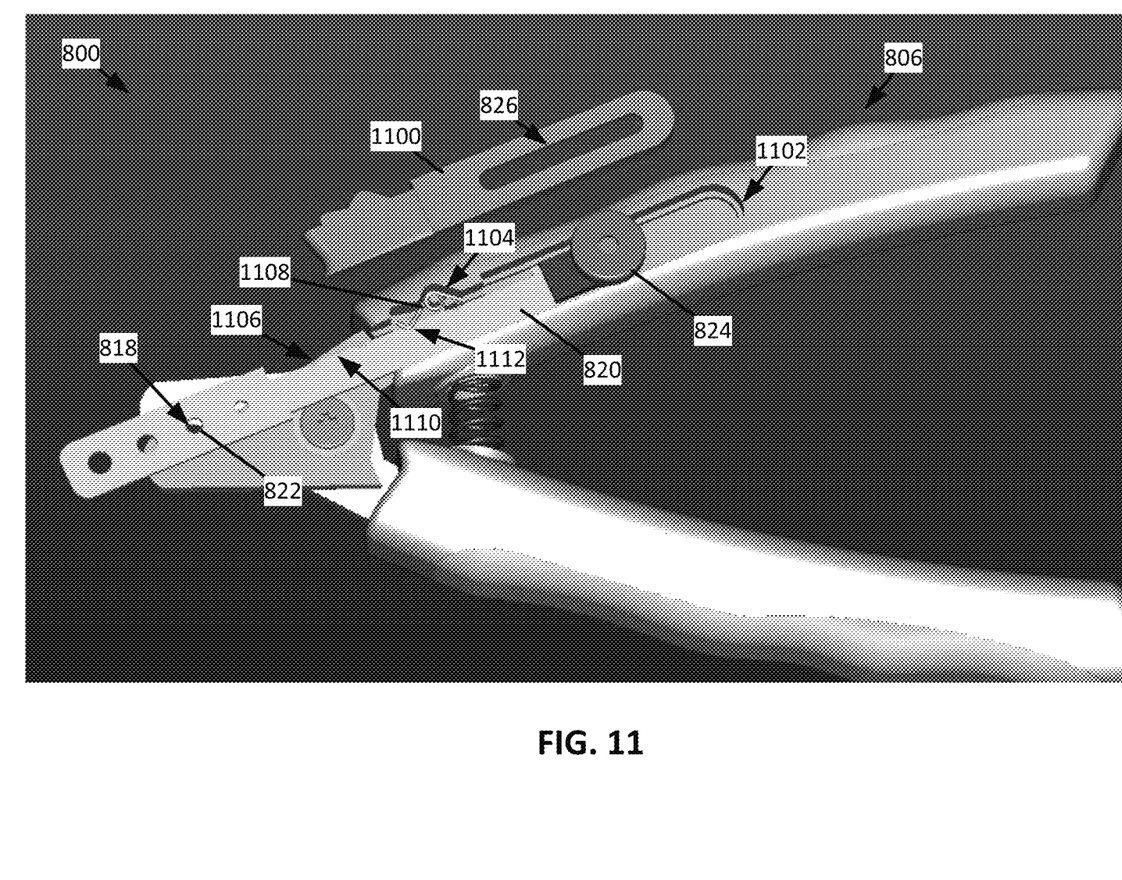
FIG. 11 shows an exploded view of the trimming shears of FIG. 8 in a pre-cut position, consistent with embodiments of the present disclosure.

FIG. 11 shows an exploded view of the trimming shears 800 in the pre-cut position. As shown, the slot 826 is defined in a plate 1100 that extends over a track 1102 defined in the first handle portion 806. In other words, when coupled to the first handle portion 806, the plate 1100 at least partially encloses the track 1102 such that the actuator 824 extends from the slot 826. The track 1102 is configured to slidably receive the guide 820 such that the guide 820 slides within the track 1102 in response to movement of the actuator 824 within the slot 826. An indexer 1104 can be coupled to the first body 802. For example, the indexer 1104 can be coupled to the first handle portion 806 such that at least a portion of the indexer 1104 extends within the track 1102. The indexer 1104 is configured to retain the guide 820 at one or more predetermined positions relative to the cutting region 818. At least one of the one or more predetermined positions corresponds to a position in which a respective one of the apertures 822 is aligned with the cutting region 818.

As shown, the indexer 1104 is configured to engage with a respective one of a plurality of recesses 1106 defined in the guide 820. The indexer 1104 includes a spring arm 1108 configured to move between a retention position and an adjusting position. As such, in some instances, the indexer 1104 may be spring (e.g., a torsion spring). When in the retention position, at least a portion of the spring arm 1108 is received within a respective recess 1106 defined within the guide 820. The spring arm 1108 is urged towards an adjusting position in response to the actuator 824 urging the guide 820 to slide within the track 1102. When in the adjusting position, the spring arm 1108 is out of engagement with a respective recess 1106 and slidably engages a transition surface 1110 of the guide 820 that extends from the respective recess 1106 (e.g., extends between immediately adjacent recesses 1106).

The spring arm 1108 can include an engagement region 1112 that is configured to be received within the recesses 1106. The engagement region may have a shape that generally corresponds to a shape of the recesses 1106. The shape of the engagement region 1112 and the recesses 1106 may be configured to cooperate such that the spring arm 1108 can be caused to transition from the retention position to the adjusting position in response to the actuator 824 being exposed to a predetermined force exerted along an axis that extends generally along the track 1102. For example, the engagement region 1112 and recesses 1106 may have a triangular shape, an arcuate shape, and/or any other shape configured such that the spring arm 1108 is transitioned from the retention position to the adjusting position in response to the actuator 824 being exposed to a predetermined force exerted along an axis that extends generally along the track 1102.

As shown, the guide 820 includes at least four recesses 1106 and at least four apertures 822, wherein each recess 1106 corresponds to a respective aperture 822 such that, when the engagement region 1112 is received within a corresponding recess 1106, the respective aperture 822 is aligned with the cutting region 818. While the guide 820 is shown as having four recesses 1106, the guide 820 may have any number of recesses 1106. For example, the guide 820 may have at least two recesses 1106, at least three recesses 1106, or any other number of recesses 1106.

Figure 12:
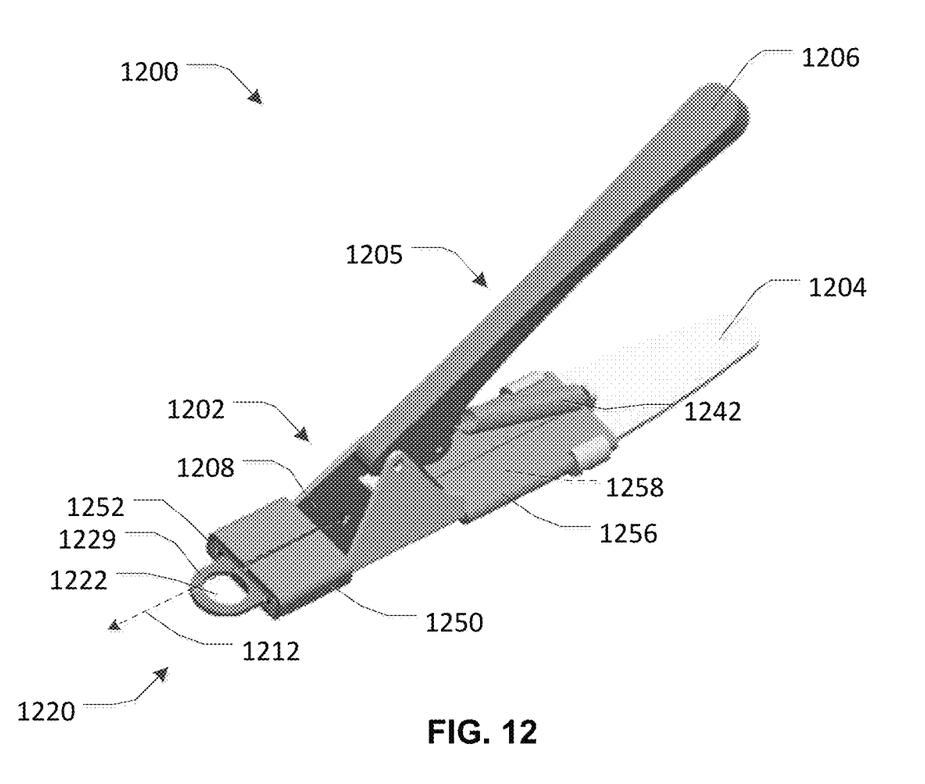
FIG. 12 shows a perspective view of an example trimming shears in a pre-cut position, consistent with embodiments of the present disclosure.
Figure 13:
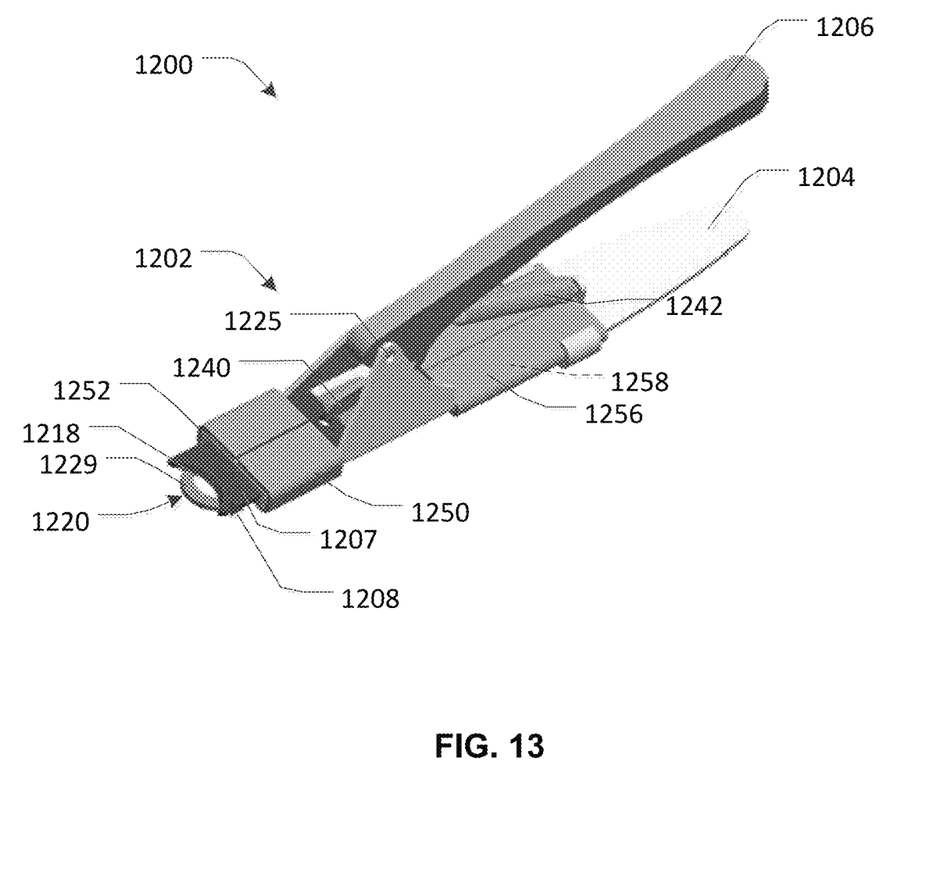
FIG. 13 shows a perspective view of the trimming shears of FIG. 12 in a cut position, consistent with embodiments of the present disclosure.
Figure 14:
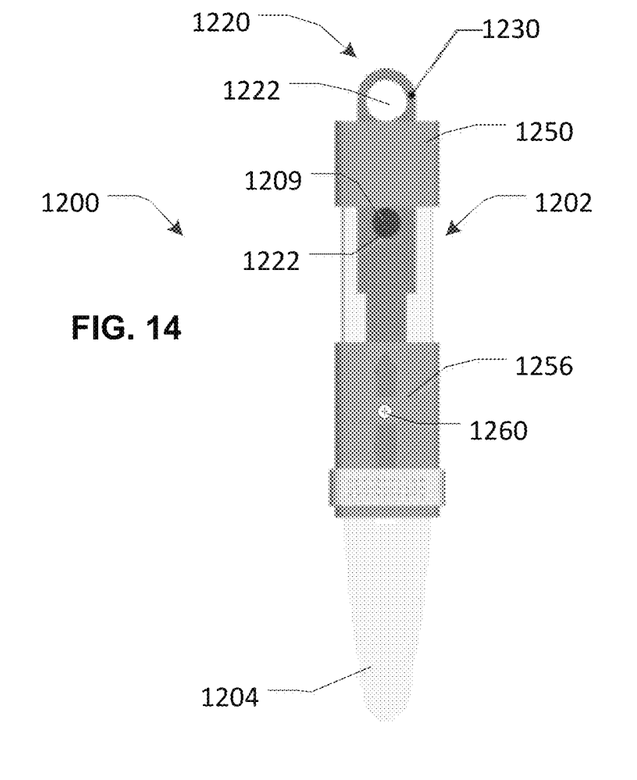
FIG. 14 shows a bottom view of the trimming shears of FIG. 12 in a pre-cut position, consistent with embodiments of the present disclosure.

FIGS. 12-16(D) show example trimming shears 1200 with a guillotine (linear movement) cutter. Trimming shears 1200 include an elongated first body 1202 comprising a first handle 1204, an elongated second body 1205 comprising a second handle 1206 pivotally coupled to the first body 1202, a planar blade 1208, and an elongated planar guide 1220 extending from the body 1202. The guide 1220 defines a plurality of apertures 1222 for receiving at least a portion of a claw of an animal. Guide 1220 of trim shears 1200 is not formed integrally with first body 1202 as a single, monolithic piece as shown with trimming shears 100, but rather as a separate replaceable elongated component as shown with trimming shears 500. Pivotal movement of the second body 1205 relative to the first body 1202 urges the blade 1208 along a blade cutting axis/path 1212 between a pre-cut position (e.g., as shown in FIG. 12, which may also be referred to as a retracted position, and a cut position (e.g., as shown in FIG. 13), which may also be referred to as an extended position. The blade cutting axis/path 1212 extends in a blade plane (shown at 113 in FIG. 1B) such that the blade 1208 moves linearly in the blade plane and parallel to a top surface 1229 of the guide 1220. The blade plane extends transverse, and more particularly substantially perpendicular (e.g. within 5 degrees of being perpendicular), to a handle pivot plane (shown at 115 in FIG. 1B). The handle pivot plane, which also may be referred to as a common plane, extends through the first and second handle 1204 and 1206 such that the pivotal movement of the first and/or second handles 1204 and 1206 occurs in the handle/common plane.

When in the pre-cut position, the blade 1208 is positioned along the guide 1220 such that a claw received within the selected aperture 1222 is not in cutting contact with the blade 1208. Unlike the trimming shears 100, with trimming shears 1200, when the blade 1208 is in the pre-cut position, the blade 1208 generally does not partially obscure the aperture 1222. As such, when the blade 1208 is in the pre-cut position, a maximum insertion distance of the claw within the aperture 1222 is not generally at least partially defined by the pre-cut position of the blade 1208. In other words, for trimming shears 1200, an effective opening area of the aperture 1222 (e.g., the opening area of the aperture 1222 capable of receiving a claw) is generally not adjusted through adjusting the pre-cut position of the blade 1208 relative to the aperture 1222. With the trimming shears 1200, such is accomplished generally with the plurality of different sized apertures 1222.

As such, trimming shears 1200 do not need to include an indexer 116 shown with trimming shears 100. However, it should be understood that the indexer 116 (including indicator 117) may be included with the trimming shears 1200, and the blade 1208 may be used to at least partially define the aperture 1222 as a further fine-tuning mechanism to achieve an aperture 1222 sized between two adjacent sized apertures 1222 of the guide 1220.

As best shown in FIG. 13, the blade 1208 defines a beveled cutting edge 1218 having a concave arcuate shape (e.g., a semi-circular or semi-elliptical shape). The arcuate shape may generally correspond to the shape of a claw. As shown, when second body 1205/second handle 1206 is pivoted about pivot/pin axis 1225 downwards relative to (towards) first body 1202/first handle 1204, pivot arm 1240 urges the blade 1208 to extend forward. Conversely, when the force urging second body 1205/second handle 1206 towards first body 1202/first handle 1204 is released or otherwise removed, bias mechanism 1242 (e.g. helical compression spring) urges the second 1205/second handle 1206 upwards relative to (away from) first body 1202/first handle 1204. As shown, when second body 1205/second handle 1206 is pivoted about pivot/pin axis 1225 upwards relative to (towards) first body 1202/first handle 1204, pivot arm 1240 urges the blade 1208 to retract backwards.

As shown, at a forward end region (forward of pivot/pin axis 1225) of first body 1202, the first body 1202 as well as the blade 1208 and the guide 1220 are all disposed and held in relative position to one another in an enclosed polygonal (particularly quadrilateral and more particularly rectangular) passage 1252 of a planar annular reinforcement member 1250, shown as a split rectangular annulus/ring. Alternatively, while passage 1252 is shown formed by annular member 1250, passage 1252 may also be formed by body first 1202, with or without the annular member 1250, to accommodate the blade 1208 and the guide 1220 therein.

As shown, the annular member 1250 conceals the beveled cutting edge 1218 of the blade 1208 in the pre-cut or retracted position of the blade 1208 from inadvertent contact. The annular member 1250 also permits the both the blade 1208 and the guide 1220 to movably, and more particularly slidably, extend forwards and movably, and more particularly slidably, retract backwards therein relative to each other and the annular member 1250.

As shown, at the rearward end region (rearward of pivot/pin axis 1225) of first body 1202, the first body 1202 and the guide 1220 are disposed and held in relative position to one another in an enclosed passage 1258 of another planar annular reinforcement member 1256, shown as a split rectangular annulus/ring. Alternatively, while passage 1258 is shown formed by annular member 1256, passage 1258 may also be formed by first body 1202, with or without the annular member 1256, to accommodate the guide 1220 therein.

As best shown by FIGS. 12, 14 15A and 15B, guide 1220 has a blade facing top receiving surface 1229, a bottom surface 1230 opposite the top surface 1229, and a plurality of apertures 1222 extending from the top surface 1229 to the bottom surface 1230. The top surface 1229 and the bottom surface 1230 are substantially parallel to (e.g., within 5°, 4°, 3°, 2°, or 1° of parallel) to one another.

Figure 15A:
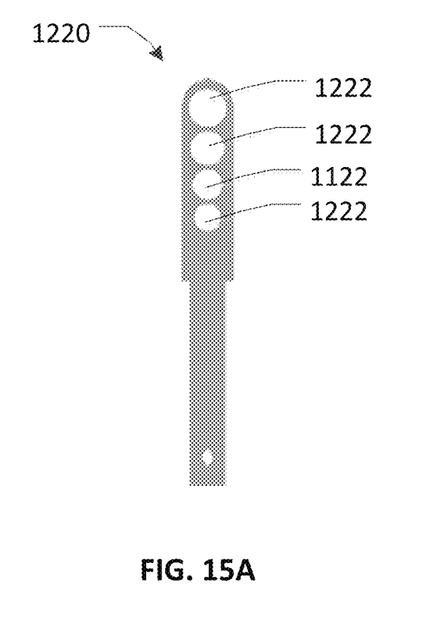
FIG. 15A shows an example of a guide of the trimming shears of FIG. 12, consistent with embodiments of the present disclosure.
Figure 15B:
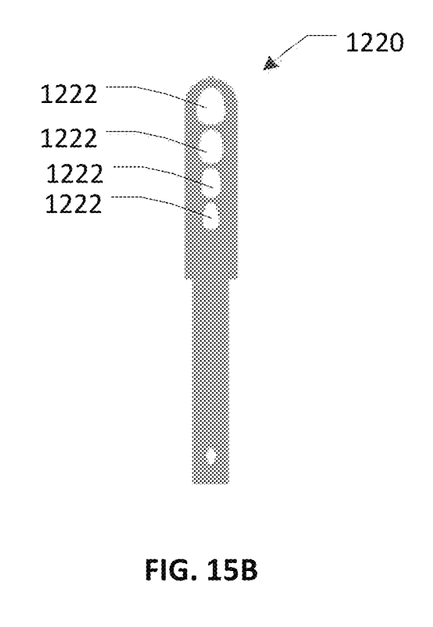
FIG. 15B shows an example of a guide of the trimming shears of FIG. 12, consistent with embodiments of the present disclosure.
Figures 16A, 16B, 16C, 16D:
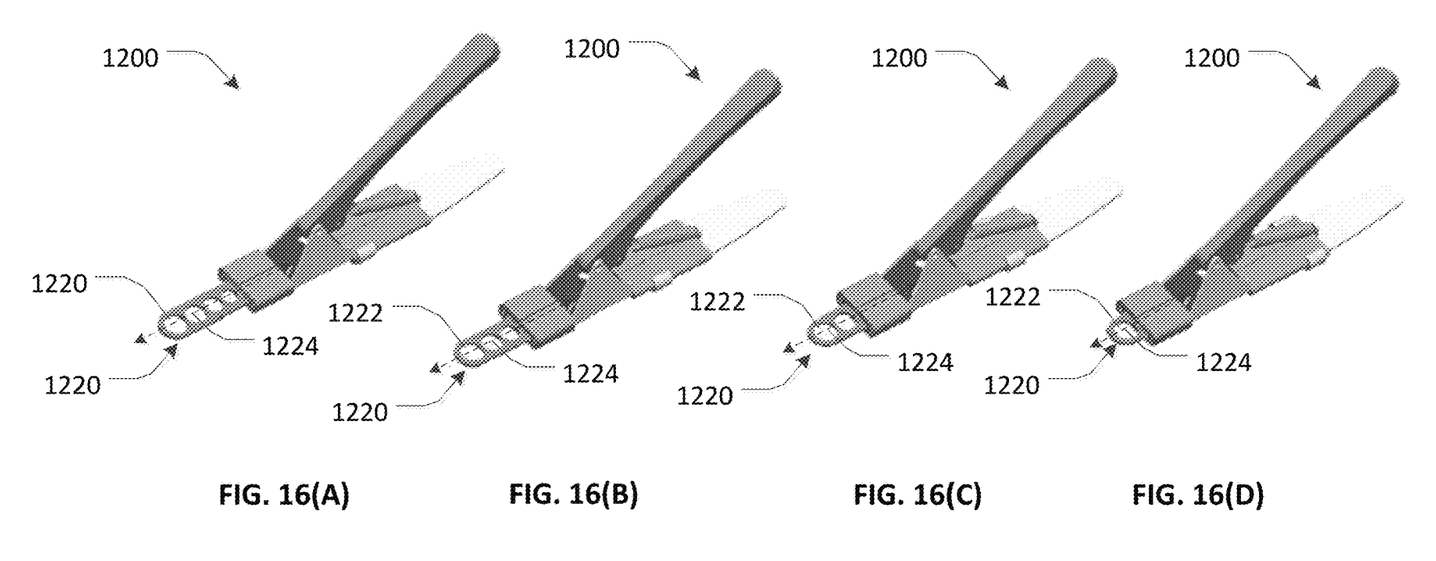

The apertures 1222 are configured to receive a claw of an animal therein. For example, the guide 1220 may include at least four apertures 1222. The guide 1220 may be configured to be transitioned between a (concealed) storage position (not shown) and a plurality of use positions (e.g., as shown in FIGS. 16A-16D). As best shown in FIGS. 15A-15B, each of the apertures 1222 has a different size, wherein each size is configured to limit a maximum insertion distance of a claw inserted therein. As such, the size of the apertures 1222 may be based on a claw size for various animals and/or animals of different sizes. For example, and as shown, the guide 1220 may include four apertures 1222 arranged according to size from largest to smallest. For example, a diameter of each of the apertures 1222 may measure in range of 0.5 millimeter (mm) to 6.5 mm. By way of further example, a first aperture 1222 may have a diameter measuring 2 mm, a second aperture 1222 may have a diameter measuring 2.5 mm, a third aperture 1222 may have a diameter measuring 3 mm, and a fourth aperture 1222 may have a diameter measuring 3.5 mm. By way of still further example, a first aperture 1222 may have a diameter measuring 4 mm, a second aperture 1222 may have a diameter measuring 4.5 mm, a third aperture 1222 may have a diameter measuring 5 mm, and a fourth aperture 1222 may have a diameter measuring 5.5 mm. By way of still further example, a first aperture 1222 may have a diameter measuring 1.5 mm, a second aperture 1222 may have a diameter measuring 2 mm, a third aperture 1222 may have a diameter measuring 2.5 mm, and a fourth aperture 1222 may have a diameter measuring 3 mm.

In some instances, a measure of a difference in diameter between immediately adjacent apertures 1222 may be at least 0.5 mm. For example, a first aperture 1222 may have a diameter that measures 1.5 mm and a second, immediately adjacent, aperture 1222 may have a diameter that measures 2 mm. While the guide 1220 is shown as having four apertures 1222, the guide 1220 may have any number of apertures 1222. For example, the guide 1220 may have at least two apertures 1222, at least three apertures 1222, or any other number of apertures 1222.

In some instances, and as shown in FIG. 15A, each of the apertures 1222 may have a circular shape. In other instances, as shown on FIG. 15B, at least one of the apertures 1222 may have a non-circular shape, e.g., oval. For example, at least one aperture 1222 may have an elliptical shape. The apertures 1222 may include a tapered region extending around a perimeter of the apertures 1222 such that a central cross-section of at least a portion of each of the apertures 1222 is frustoconical. Such a configuration may allow for a claw to be more easily inserted therein.

The guide 1220 is movably, and more particularly slidably, coupled to first body 1202, annular member 1250 and annular member 1256 such that an extended/retracted position of the guide 1220 can be adjusted relative to the cutting edge 1218 of the blade 1208. For example, the guide 1220 can be slid along first body 1202, annular member 1250 and annular member 1256 such that an aperture 1222 having a size that corresponds to a claw of an animal to be trimmed is positioned so as to be cut by the cutting edge 1218 of the blade 1208 when the blade 1208 is extended from the pre-cut (retracted) position to the cut (extended) position. Stated another way, each aperture 1222 of the guide 1220 is positionable relative to the cutting edge 1218 such that, when the blade 1208 is moved from the retracted position to the extended position, the cutting edge 1218 cuts a claw when disposed in each aperture 122, respectively.

As shown, the guide 1220 is configured to slide along a guide positioning axis/path 1224, which extends substantially parallel (e.g., within 5 degrees of being parallel) to the blade cutting axis/path 1212, and a guide plane, which extends substantially parallel (e.g., within 5 degrees of being parallel) to the blade plane. More particularly, the guide 1220 and the blade 1208 may be configured to move, and more particularly slide, substantially parallel to one another (e.g., within 5 degrees of being parallel), with the top surface 1229 of the guide 1220 adjacent and/or in contact with a bottom surface 1209 of the blade 1208, which is opposite the top surface 1207 of the blade 1208. The top surface 1229 of the guide 1220 and the top surface 1207 of the blade 1208 may generally be described as the surfaces that face an animal when inserting a claw into the aperture 1222.

The guide 1220 is configured to move, and more particularly slide, linearly along the guide positioning axis/path 1224 within annular member 1250 and annular member 1256. Stated another way, the annular member 1250 and annular member 1256 are configured to moveably, and more particularly slidably, receive the guide 1220 (as well as the blade 2108) therein. The guide 1220 can be configured to form an interference fit with the annular member 1250 and annular member 1256 such that movement of the guide 1220 within the annular member 1250 and annular member 1256 requires exertion of a predetermined amount of force. As shown by FIGS. 15A and 15B, the guide 1220 may be insertable into and removable from a remainder of the trimming shears 1200 as a separable insert. Such may be desirable to change the size and/or shape of the apertures 1222.

Referring briefly to FIG. 12, the underside of annular member 1256 may include a locking mechanism 1260, particularly comprising a set screw, which locks the guide 1220 in place once a suitable position of the guide 1220 has been achieved for trimming the desired claw. Screw may threadedly engage with a threaded through-hole in annular member 1256.

Deactivating the locking mechanism 1260 by loosening the screw may allow the guide 1220 to move as set forth above relative to the first body 1202, annular member 1250 and annular member 1256. Once a suitable position of the guide 1220 has been achieved for trimming the desired claw, the locking mechanism 1260 may be activated by tightening the screw, in which case an end face of the screw presses (clamps) the guide 1220 against the first body 1202 and annular member 1256. In such instance, the guide 1220 may be held in fixed position when the claw is cut/trimmed.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. Trimming shears to cut one or more claws of an animal comprising:
   a first body having a first handle portion;
   a second body having a second handle portion;
   the first body and the second body pivotally coupled such that at least one of the first body and the second body pivot relative to each other, about a pivot axis, in a pivot plane;
   a blade having a cutting edge, the blade movable in a blade plane along a blade path, between a retracted position and an extended position, in response to pivotal movement of at least one of the first body and the second body relative to each other, wherein the blade plane is transverse to the pivot plane;
   a guide coupled to the first body, the guide movable in a guide plane along a guide path, wherein the guide plane is substantially parallel to the blade plane and the guide having a plurality of apertures extending through the guide, each aperture of the plurality of apertures having a different size to receive the one or more claws;
   wherein each aperture of the guide is positionable relative to the cutting edge of the blade such that, when the blade is moved from the retracted position to the extended position, the cutting edge cuts a claw when disposed in each aperture, respectively; and
   wherein the blade and the guide are at least partially disposed in an enclosed passage.

2. The trimming shears of claim 1, wherein the blade and the guide are disposed adjacent one another and/or in contact with one another.

3. The trimming shears of claim 1, wherein a top surface of the guide is adjacent a bottom surface of the blade.

4. The trimming shears of claim 1, wherein, when the blade is in the retracted position, the cutting edge is concealed with the enclosed passage.

5. The trimming shears of claim 1, wherein the enclosed passage is a rectangular passage.

6. The trimming shears of claim 1, wherein the enclosed passage is formed by a rectangular ring.

7. The trimming shears of claim 2, wherein the blade is planar, and the guide is planar.

8. The trimming shears of claim 1, wherein the blade is movable linearly in the blade plane along the blade path and/or is slidable in the blade plane along the blade path.

9. The trimming shears of claim 1, wherein the guide is movable linearly in the guide plane along the guide path and/or is slidable in the guide plane along the guide path.

10. The trimming shears of claim 1, wherein the cutting edge is arcuate.

11. The trimming shears of claim 1, wherein at least one aperture of the plurality of apertures is circular.

12. The trimming shears of claim 1, wherein at least one aperture of the plurality of apertures is non-circular.

13. The trimming shears of claim 1, further comprising a bias mechanism which urges the blade to the retracted position when in the extended position.

14. The trimming shears of claim 1, wherein the blade plane is substantially perpendicular to the pivot plane.

15. The trimming shears of claim 6, wherein the rectangular ring is a split ring.

16. The trimming shears of claim 1, wherein the enclosed passage is formed by the first body.

17. The trimming shears of claim 16, wherein, when the blade is in the retracted position, the cutting edge is concealed with the enclosed passage.

18. The trimming shears of claim 16, wherein the enclosed passage is a rectangular passage.

19. The trimming shears of claim 16, wherein the enclosed passage is formed by a rectangular ring of the first body.

20. The trimming shears of claim 19, wherein the rectangular ring is a split ring.

* * * * *